United States Patent [19]

DiFlora et al.

[11] Patent Number: 5,588,810

[45] Date of Patent: Dec. 31, 1996

[54] LOW NOISE REFRIGERANT COMPRESSOR

[75] Inventors: Michael A. DiFlora; Prakash N. Pandeva, both of Bristol, Tenn.; Christopher S. Robinson, Abingdon, Va.; Philip C. Wagner, Bristol, Tenn.

[73] Assignee: Bristol Compressors, Inc., Bristol, Va.

[21] Appl. No.: 522,793

[22] Filed: Sep. 1, 1995

[51] Int. Cl.⁶ ..................................................... H02K 5/04
[52] U.S. Cl. ........................... 417/312; 181/202; 181/284; 181/403
[58] Field of Search ............................ 417/312; 181/403, 181/198, 200, 202, 284

[56] References Cited

U.S. PATENT DOCUMENTS

| | | | |
|---|---|---|---|
| 2,346,394 | 4/1944 | Rettingen | 181/198 |
| 3,789,954 | 2/1974 | Raleigh | 417/312 X |
| 3,929,207 | 12/1975 | Urban | 181/198 |
| 3,960,237 | 1/1976 | Sleeper | 181/200 |
| 4,110,876 | 9/1978 | Weiss et al. | 181/200 X |
| 4,435,877 | 3/1984 | Benfield | 417/312 X |
| 4,982,812 | 1/1991 | Hwang | 181/202 |
| 5,151,018 | 9/1992 | Clendenin et al. | 417/312 |
| 5,217,716 | 6/1993 | Schmanski et al. | 181/284 X |
| 5,272,285 | 12/1993 | Miller | 181/202 |

*Primary Examiner*—Richard E. Gluck

[57] ABSTRACT

A sound barrier cover for a compressor unit which has a housing provided by a substantially continuous wall which provided with a plurality of access ports therethrough. The barrier cover has first and second shell sections configured to lie close to the housing wall and substantially envelope the same wherein the shell sections are configured to provide two substantially longitudinally oriented halves each having sound absorbing material affixed to its inner surface. These halves have perimeters with portions thereof formed with mating tongue and groove structure and carry cooperating components of snap-fastener devices in close proximity to the perimeters. These snap-fastener devices are adapted to hold the perimeters in contact with each other and with the sound absorbing material in resilient contact with the housing.

8 Claims, 6 Drawing Sheets

1

LOW NOISE REFRIGERANT COMPRESSOR

FIELD OF THE INVENTION

This invention concerns refrigerant compressor units and particularly concerns a unique sound barrier construction that is especially adapted to markedly diminish the power of high frequency and other compressor noise which typically results from valve noise, imbalances or the like and which may be manifested in downstream structural vibrational noise or in compressor noise emanating directly from the metal compressor shell through vibrations thereof.

BACKGROUND OF THE INVENTION in the case of refrigerant compressors used for air conditioning and heat pump applications, sound has become an increasingly important criteria for judging user acceptance. Accordingly, there is a demand for improved refrigerant compressors and refrigeration systems which are quieter than those presently available, while sacrificing none of the advantages of existing compressors and refrigeration systems.

In this regard, the design and use of compressor unit housings must take into account many factors including the gas flow volumes and flow patterns within the housing and the space limitations of the housing with regard to accommodating various compressor components including the sizes, shapes and arrangement, e.g., of discharge mufflers, suction plenums, discharge gas shock loops and the like. For example, while improved sound attenuation, in some instances, achieved by is modifying the compressor suspension system, shock loop arrangement, mounting springs, top stabilizer spring mounting, mounting brackets, housing thickness, or the like, prior designs incorporating such modifications have increased the weight of the unit to such an extent that the added shipping and handling costs as well as the additional expenses of material and manufacturing have more than offset the advantages attained in the resulting noise reduction.

DISCUSSION OF PRIOR ART

Further in regard to compressor housing design and configuration considerations, the particular objectionable operating noise frequencies encountered for a particular compressor construction will have a very significant influence on such considerations. For example, as discussed in U.S. Pat. No. 5,101,931, discharge pressure pulsation frequencies such as 1,000 Hz create noise which must be attenuated. Such noise and noise of higher frequencies are generated, for example, by the operation of the compressor valves, whether they be steel or other material, and conventional thin steel reed type valving such as shown in the aforesaid patent wherein metal to metal contact, often exacerbated by fluttering of the valve against the discharge porting seat, gives rise to high frequency harmonics of the fundamental low frequency pulsations. These objectionable harmonic vibrations are readily transmitted through various sound wave carrying components of the compressor including metal parts and compressor sump oil and are transmitted through or by the housing to the compressor exterior and ultimately to the human ear as objectionable sound waves.

Previous methods and devices for attenuating such compressor noise are exemplified by U.S. Pat. Nos.: 4,264,282; 4,982,812; 4,991,406; 5,151,018, and 5,272,285, the disclosure of which concerning materials of construction, utility or the like are hereby incorporated herein by reference, and which employ sound deadening enclosures in which the compressor is contained. Such enclosures are generally quite complex in both structure and assembly procedure and greatly add to the overall dimensions and costs of the enclosed compressor. These devices, therefore, cannot be utilized, in any convenient manner, in the restricted space of the refrigeration units which utilize applicants compressors.

Objects therefore, of the present invention are: to reduce compressor noise by providing a unique and highly effective sound barrier means without the need for modifying the housing construction of compressor units, whereby the level of noise reduction achieved markedly exceeds any disadvantages due, e.g., to increased costs in manufacture or handling; to provide such a barrier means which is in the form of a close-fitting enclosure for the compressor but which is essentially smooth surfaced and effects no significant enlargement of any longitudinal or radial dimensions of the compressor housing, i.e., no more than about 10.0% and preferably no more than about 7.5% taken along any longitudinal or radial line of the housing; and to provide such a barrier means in sections which can be readily snap-fitted together in exact position on the compressor housing for allowing strong adhesive joining including, e.g., sonic welding of the sections in a permanent and production-rate-effective manner and with a minimum of worker effort and time, for greatly enhancing the strength, durability and stability of the barrier means, and thus the handleability of the barrier enclosed compressor such as during transport and installation thereof into a refrigeration unit.

The above and further objects hereinafter becoming evident have been attained in accordance with the present invention which in its broad sense is defined as a sound barrier means for a compressor unit having housing means comprising substantially continuous wall means having a longitudinal axis and a radial axis and containing compressor means and being provided with a plurality of porting means mounted through said wall means, said barrier means comprising first and second shell sections configured to lie close to said housing means and substantially envelope said housing means except for bottom portions thereof, said shell sections being configured to provide two substantially longitudinally oriented halves each having sound absorbing material affixed to its inner surface, said halves having perimeters formed with mating tongue and groove means, cooperating components of snap-fastener means on said halves in close proximity to said perimeters thereof, said snap-fastener means being adapted to hold said perimeters in contact with each other and with said sound absorbing material in resilient contact with said housing means and exerting radially outward force on said barrier means.

In certain preferred embodiments:

(a) said material comprises cellular, resilient elastomeric cushion means;

(b) each of said shell sections and said material comprises a plastic layer of one or a mixture of cellular polymeric material selected from polyurethane, urethane-modified isocyanurate, polystyrene, cellulose ester, poly(vinyl chloride), polyethylene, or polypropylene; and (c) the general wall thickness, i.e., average of all areas, of each said shell section being from about 0.08 to about 0.25 in., most preferably from about 0.11 to about 0.15 in.

BRIEF DESCRIPTION OF THE DRAWINGS

The invention will be further understood from the following description and drawings of preferred embodiments, wherein:

FIG. 8 is a cross-sectional view of a top portion of the cover means provided with motion limiting rib means for preventing undesirable pushing down of the barrier cover during handling, transportation or the like;

DETAILED DESCRIPTION OF THE DRAWINGS

Figure 1:
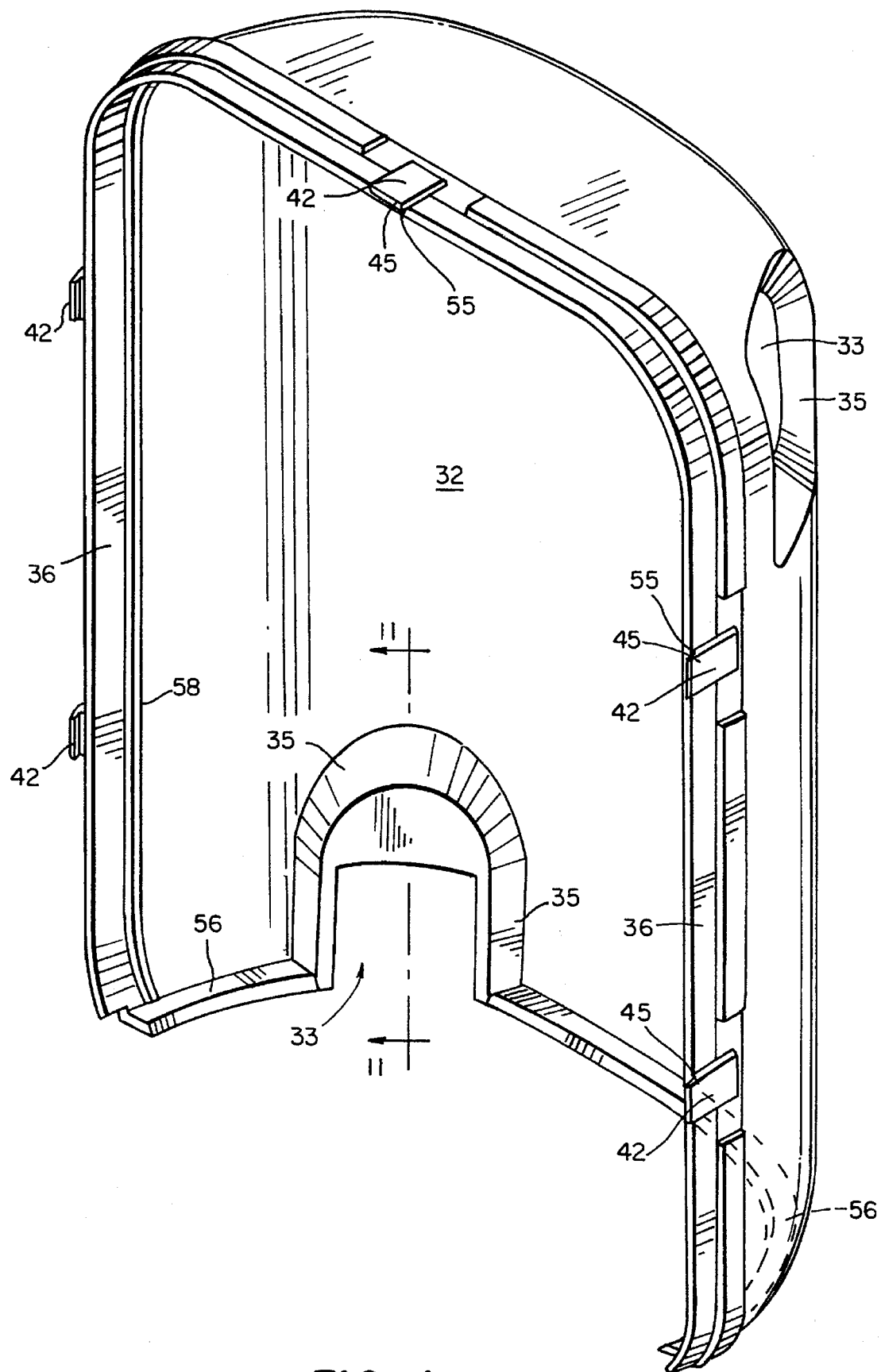
FIGS. 1 and 2 are isometric views of two halves of the present sound barrier or sound attenuation cover means.
Figure 2:
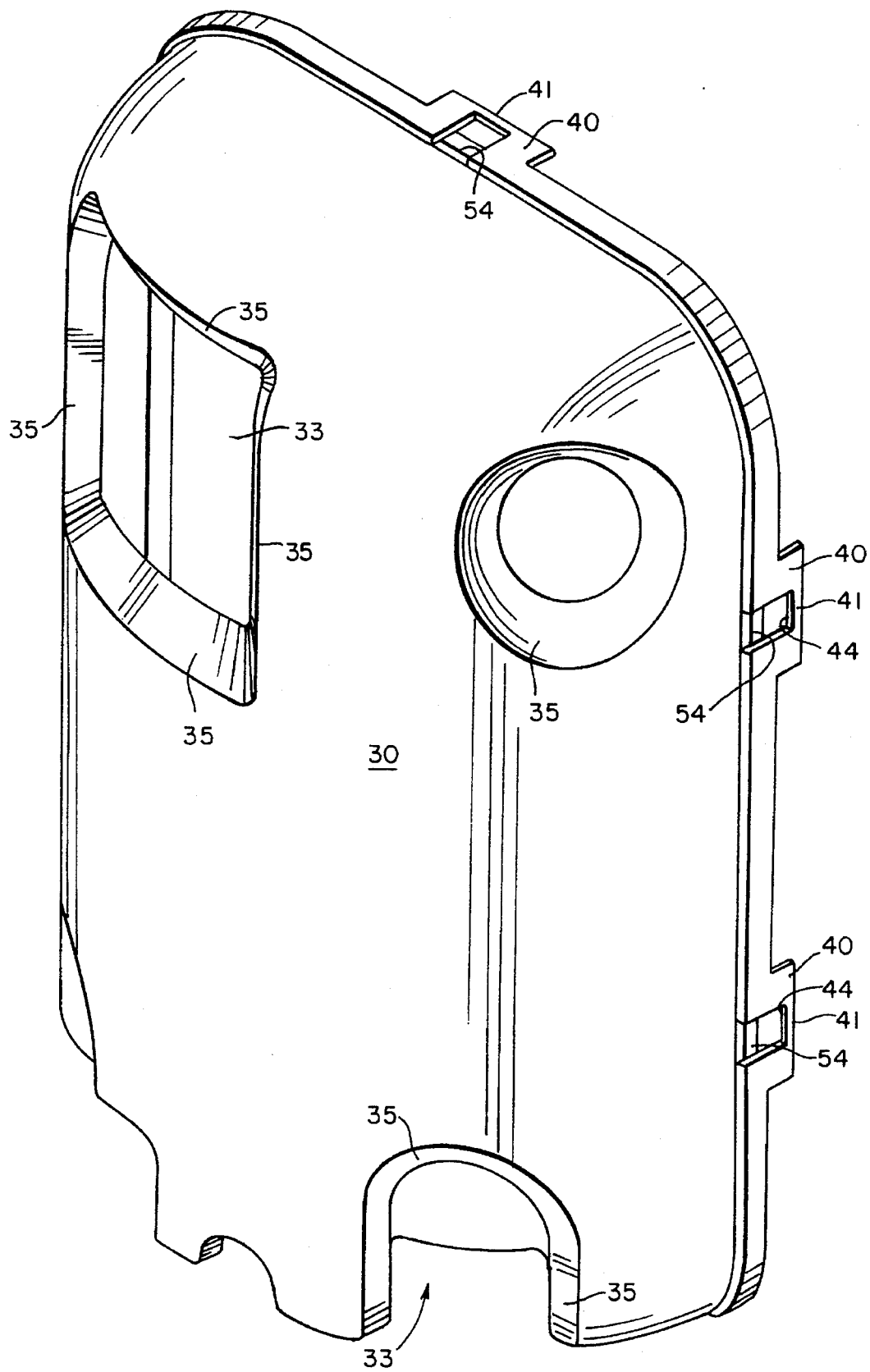
Figure 3:
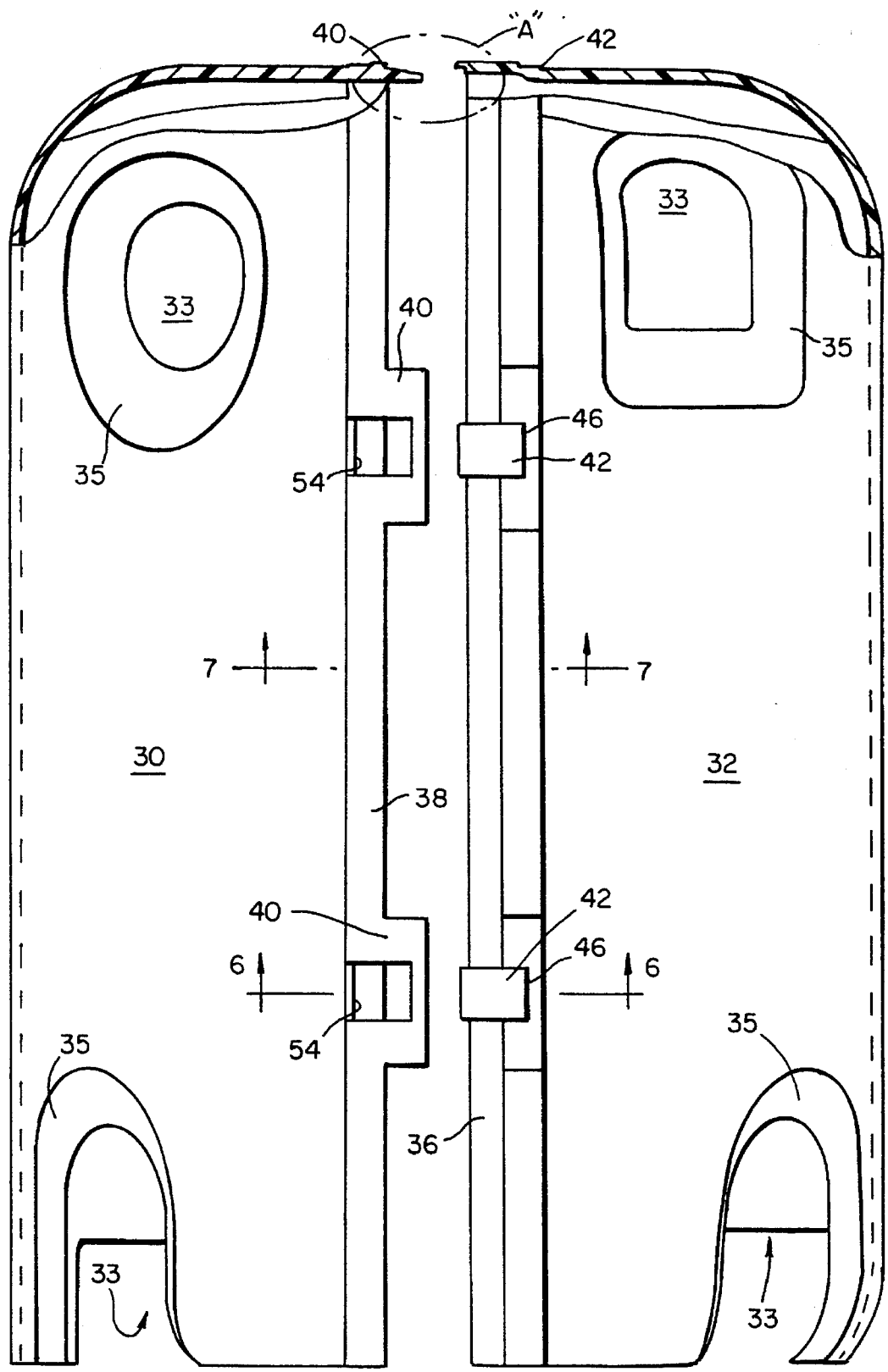
FIG. 3 is a side view, with portions broken away, of the cover halves in position for being snap-fastened together with portions broken away clarity for and with the dotted encircled are "A" shown in detail in FIG. 6.
Figure 4:
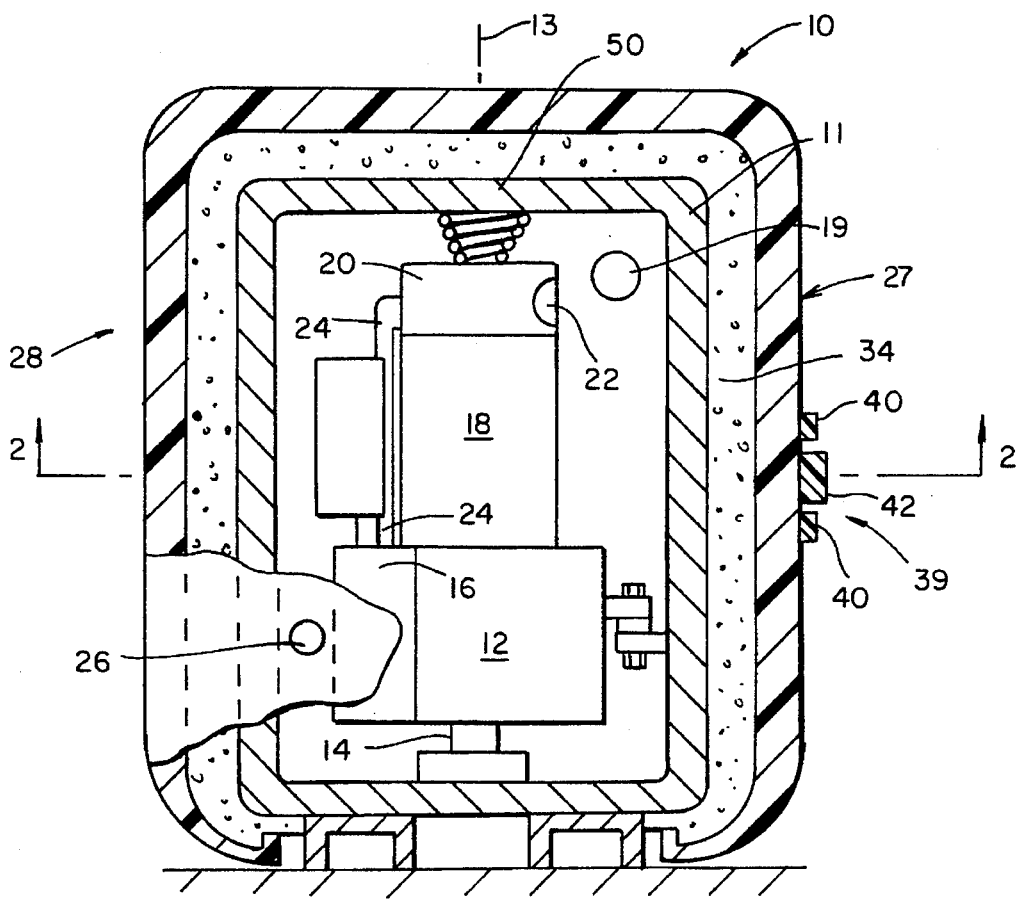
FIG. 4 is a longitudinal cross-section of a refrigerant gas compressor unit with the cover of FIG. 3 in place thereover and showing a snap-fastener in operative position with portions of the snap-fastener area and other thicknesses shown enlarged for clarity.
Figure 5:
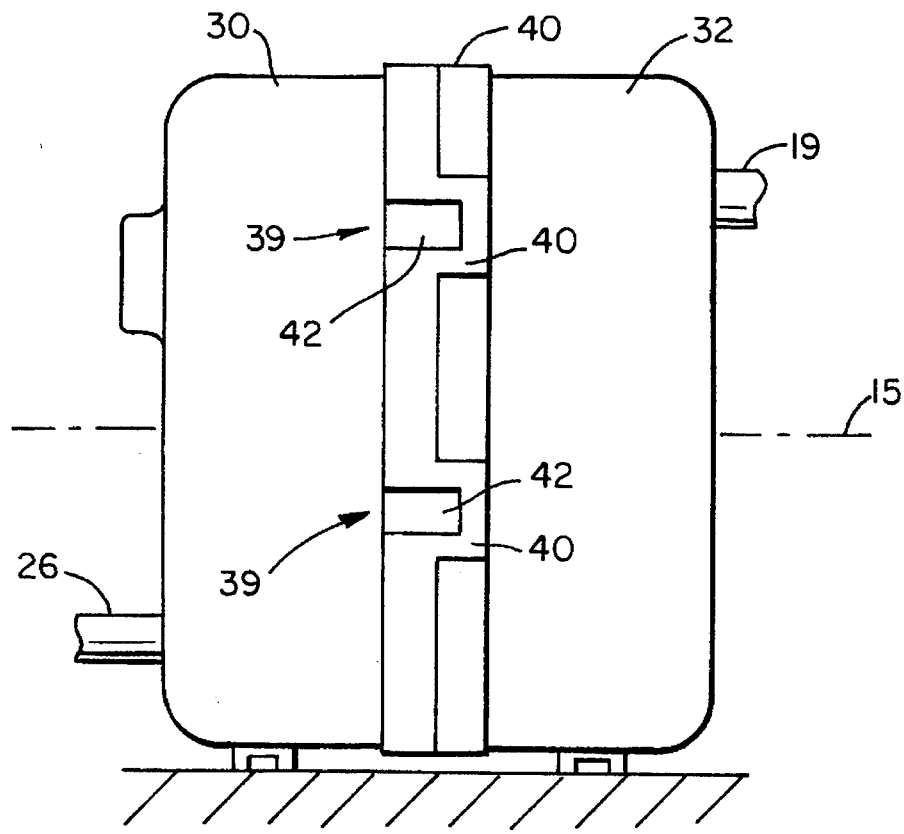
FIG. 5 is a side view of the assembled halves of the present cover means.

Referring to the drawings, particularly FIGS. 4 and 5, the compressor unit generally designated 10 comprises a compressor having a steel housing 11 having a longitudinally axis 13, i.e., compressor crankshaft axis, and radial axis, i.e., approximate longitudinal mid-point of housing, cylinder block 12 having one or more pistons mounted on crankshaft 14, head 16, electric motor 18, return refrigerant inlet conduit 19, suction plenum having inlet aperture through the side wall thereof, suction conduit communicating with plenum 20 and the compressor suction inlets, and discharge conduit or shock loop 26. Such a compressor is shown, for example, in U.S. Pat. Nos.: 5,238,370; 5,123,816; 5,080,130, the disclosures of which are hereby incorporated herein by reference. The present invention is, however, further useful with to a wide variety of compressor types and configurations.

Figure 7:
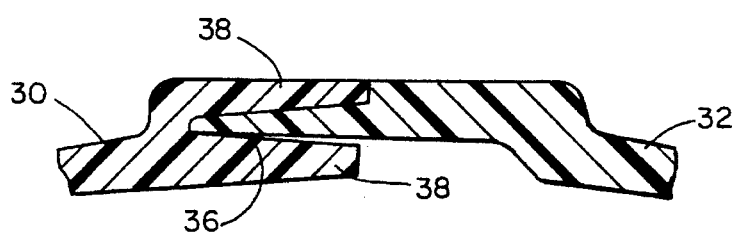
FIG. 7 is a cross-sectional view of the assembled halves taken along line 7—7 of FIG. 3 in the direction of the arrows showing an undercut of the abutting shoulders providing a positive look between the two halves.
Figure 6:
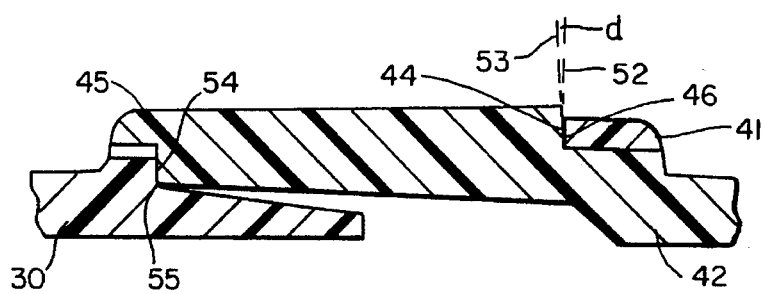
FIG. 6 is a cross-sectional view taken along line 6—6 of FIG. 3 in the direction of the arrows showing a snap-fastener area in enlarged detail.

The present unique barrier means or cover means generally designated 27, with reference to the claims hereof, comprises a semi-rigid outer shell 28 provided as two approximate halves or cover sections 30 and 32 of strong material such as structural grade poly(vinyl chloride), polyamide, polycarbonate, polyolefin, cellulose acetate-butyrate, or the like, of the aforesaid general wall thickness, most preferably about 0.125 inches, and a resilient sound absorbing cushion 34 adhered to the inner surface of each said half to provide the separate cover sections. Cushion 34 preferably is sufficiently resiliently compressive as to snugly contact compressor housing 11 as sections 30 and 32 are urged into mating contact with each other without exerting a separating force which might be sufficient to disturb such mating contact. This contact is shown in FIG. 7 wherein the inner edge 36 of section 32 is formed to provide a wedge shape, and inner edge 38 of section 30 is recessed to matingly receive edge 36 such that the perimeter of the halves are automatically aligned. Other equivalent self-aligning configurations may, of course, be employed, and the wedges and recesses may be reversed on the halves.

Any suitable number of snap-fastener means generally designated 39 are provided by cooperating segments 40 and 42 on sections 30 and 32 respectively. Segments 40 and 42 are formed with cooperating latching shoulders 44 and 46 respectively such that when sections 30 and 32 are moved together to mate the inner peripheral edges thereof, the shoulder providing portions 41 of segments 40 are flexed radially outwardly by sliding contact with the ramp or cam surfaces 45 on the leading edges of segments 42 and then snapped inwardly as shoulders 44 and 46 become juxtaposed. This abutment type of connection tends to tighten the segments as the resilient and partially compressed cushion 34 exerts a radially outward force on the halves.

In a preferred embodiment of the above described latching means as shown in enlarged detail in FIG. 7, shoulders 44 and 46 of the snap-fasteners in their abutting position lie in a plane 52 which is oriented with respect to the direction of radial expansion, i.e., radial line 53, of the snap-fastener area caused by the outward force exerted by the cushion means such that shoulders 46 are undercut. e.g., angle α of 2–10° or so, such that radially outward movement of shoulder portions 46 of segments 40 are essentially prevented. This shoulder orientation further enhances the locking function of the snap-fasteners by generating camming forces directed generally laterally against shoulders 46 tending to tighten the abutment of the oppositely disposed shoulders 54 and 55 of segments 40 and 42 respectively. This same locking aspect is achieved by an undercut of the latching shoulders at the top of the barrier cover during longitudinally directed expansion of the cover.

Figure 8:
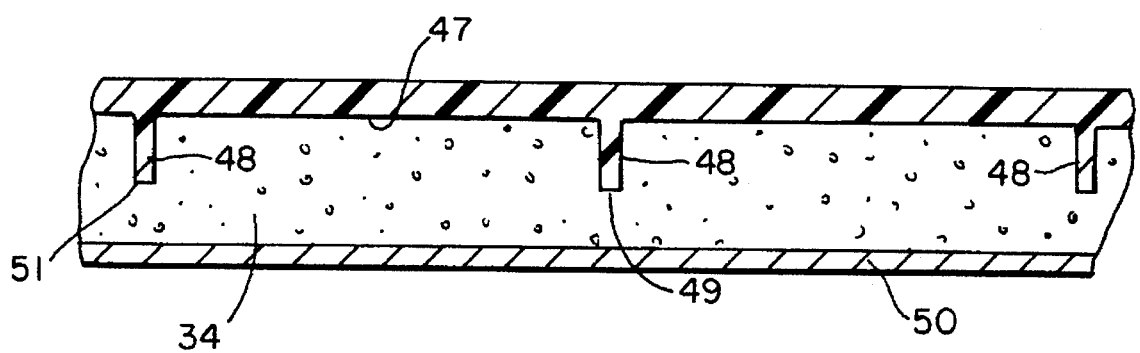
Figure 9:
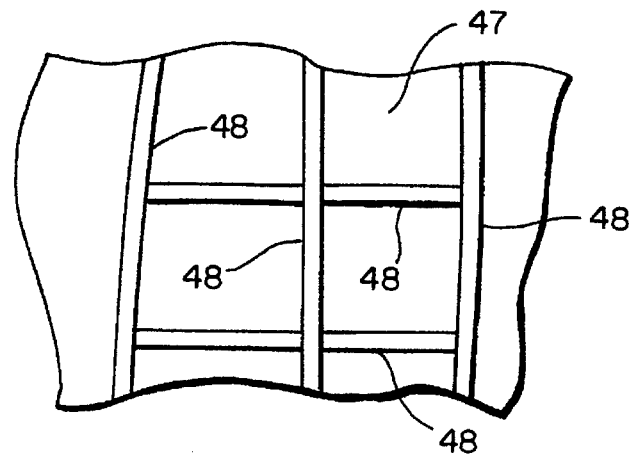
FIG. 9 is an alternative grid type form of the ribs of FIG. 8 in elevational view.
Figure 10:
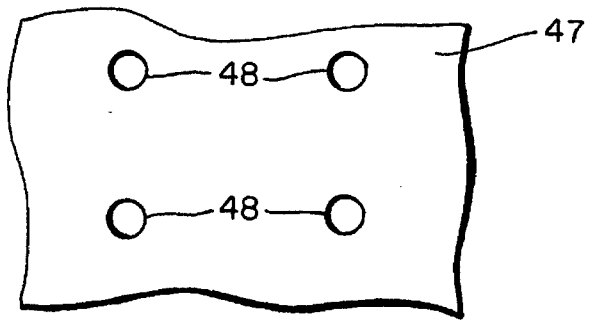
FIG. 10 is a spike or post configuration of the ribs in elevational view.
Figure 11:
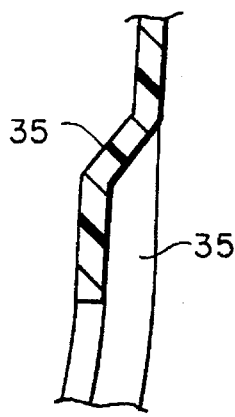
FIG. 11 is a cross-sectional view taken along line 11—11 of FIG. 1 in the direction of the arrows.

Sections 30 and 32 have wall thickness, e.g., of about one eighth inch and are provided with suitable access apertures such as 33 for closely accommodating the various inlet and discharge conduit segments, electrical control means, service connections, or the like. Referring particularly to FIG. 11, the portions 35 of the walls of sections 30 and 32 which border and define access apertures 33 are slanted radially inwardly in the embodiment shown. These apertures are positioned such that the cover halves can be moved together to form the joint therebetween without interfering with the joint area, which otherwise would complicate the barrier cover structure and its assembly procedure. In this regard, with reference to FIGS. 8, 9 and 10, in a preferred embodiment, the inner surface portions 47 of the top areas of the cover halves are provided with downwardly extending rib means 48 of any configuration and arrangement such as shown in FIGS. 9 and 10 wherein grid and spike type arrangements are respectively shown. These ribs are dimensioned such that some clearance 51, e.g., 0.25 inches exists between the lower edges 49 of the ribs and the top 50 of the compressor housing under normal conditions, with small portions of the cushion 34 compressed therebetween. This construction prevents the cover means 27 from moving downwardly with respect to the compressor housing such a sufficient distance to misalign the various access apertures 33 or forcibly contact the cover means with such elements. Consequently apertures 33 can be formed to minimum dimensions. It is particularly noted that the volume of cushion material compressed by the ends of these ribs or spikes is very small and does not significantly diminish the sound attenuation capacity of the cushion. The clearance 51 can be varied according to access aperture design or other factors and can be, e.g., from a few thousandths of an inch to 0.5 in., or more. Strengthening or rigidifying ribs such as 56 and 58 may be strategically molded or otherwise provided on the inner surfaces of the halves.

The actual configuration of the present barrier cover may be tailored to snugly surround all but selected portions of the bottom of any compressor housing such that the feet of the compressor unit will be readily accessible for mounting the unit onto a desired base. Likewise, the thickness of the outer shell 28 of the barrier cover as well as the sound insulating layer or cushion 34 may be selected to provide desired properties, e.g., of sound attenuation and strength. The following table gives the structural and other parameters for the best mode of practicing the present invention for a typical double cylinder 1.5–6.0 ton compressor.

| Barrier Shell Material | PVC |
|---|---|
| Barrier Shell General Thickness | 0.125 inches. |
| Barrier Cushion Material | Open Cell, |
| Acoustic Grade, Polyether Based Urethane, i.e., "Polyclamp Acoustical Foam" from Polymer Technologies, Inc. | |
| Barrier Cushion Density | 1.8 lbs/ft$^3$. |
| Barrier Cushion General Thickness | 0.5 inches. |

| | English Value Units | Metric Value Units | ASTM Test Method |
|---|---|---|---|
| Physical Properties | | | |
| Specific Gravity | 1.33 | 1.33 | D792 |
| Hardness (Durometer D) | 79 Points | 79 Points | D2240 |
| Mechanical Properties | | | |
| Tensile Strength | 6,000 psi | 43 MPa | D638 2"/min |
| Tensile Modulus 2"/min | 345,000 psi | 2,377 MPa | D638 |
| Flexural Strength | 10,300 psi | 71 MPa | D790 |
| Flexural Modulus | 360,000 psi | 2,480 MPa | D790 |
| Ultimate Elongation | 35% | 35% | D638 2"/min |
| ⅛ Notched Izod Impact | | | |
| @ 73° F./23° C. | 7.4 ft-lbs/in | 395.8 J/m | D256 |
| @ 32° F./0° C. | 2.1 ft-lbs/in | 112.3 J/m | D256 |
| @ 0° F./–18° C. | 0.5 ft-lbs/in | 26.7 J/m | D256 |
| Dimensional Properties | | | |
| Heat Deflection Temperature ¼" Bars | | | |
| Annealed @ 264 psi | 164° F. | 73° C. | D648 |
| Annealed @ 66 psi | 167° F. | 75° C. | D648 |
| Unannealed @ 264 psi | 157° F. | 69° C. | D648 |
| Unannealed @ 66 psi | 162° F. | 72° C. | D648 |
| Mold Shrinkage | 2–5 mils/in | .02–.05 mm/cm | D955 |

In actual noise reduction evaluation tests conducted as comparisons of the present barrier covered housing with a control compressor unit construction wherein both compressor units were otherwise essentially identical in all respects, the results of the tests show that the present invention typically effects a sound reduction of from about 5.0 dBA to about 7.0 dBA greater than the control unit tested without a shell cover.

One preferred assembly procedure for the present cover is as follows:

1. The interior walls of the shell halves are provided with the approximate 2 lb/cu ft., 0.500 in. thick foam lining in place, adhesively secured to the halves.

2. Using a pneumatic applicator gun, an operator will apply adhesive to the front cover groove.
   the groove will serve as a guide for the nozzle of the applicator gun.
   air pressure can be used to control the rate of adhesive application.
   normal air pressure for the applicator gun is approximately 40 psi.
   the adhesive will have a 2 minute open time
   the adhesive will have a 30 second set time, meaning it will hold a 5 psi load.
   the adhesive application temperature is 250° F.

3. The front shell half will be installed first and placed over the suction tube, and while pressing slightly on the suction side, the cover will be rolled over the fusite fence.
   the fusite cover will not be in place during this assembly to provide more clearance over the fusite fence.

4. The back shell half will be installed by joining it with the front half, which is being held in place. The back half will be attached to the front half via the tongue and groove and five discrete latches.
   the latches will hold the shell in place while the adhesive cures.
   the latches will secure the cover during lifting and packaging.

The invention has been described in detail with particular reference to preferred embodiments thereof, but it will be understood that variations and modifications will be effected with the spirit and scope of the invention.

We claim:

1. A sound barrier cover for a compressor unit, said unit having a housing comprising a substantially continuous wall having a longitudinal axis and a radial axis and containing a compressor and being provided with a plurality of porting means mounted through said wall, said barrier cover comprising first and second shell sections configured to lie close to said housing and substantially envelope said housing, said shell sections being configured to provide two substantially longitudinally oriented halves each having sound absorbing material affixed to its inner surface, said halves having perimeters with portions thereof formed with mating tongue and groove means, cooperating components of snap-fasteners on said halves in close proximity to the perimeters thereof, said snap-fasteners being adapted to hold said perimeters in contact with each other and with said sound absorbing material in resilient contact with said housing wall and exerting radially outward force on said barrier cover.

2. The barrier cover of claim 1 wherein said material comprises a cellular, resilient elastomeric cushion.

3. The barrier cover of claim 2 wherein each of said shell sections and said material is comprised of one or a mixture of cellular polymers selected from polyurethane, urethane-modified isocyanurate, polystyrene, poly(vinyl chloride), polyethylene, polypropylene, or cellulose esters.

4. The barrier cover of claim 2 wherein the general wall thickness of each said shell section is from about 0.08 to about 0.25 in.

5. The barrier cover of claim 1 wherein the inner surfaces of top portions of each said half are provided with generally downwardly depending ribs which are partially impressed into said sound absorbing material for limiting motion of said top portions toward the top of said housing well.

6. The barrier cover of claim 2 wherein one of said components comprises a tongue segment having a generally radially directed first shoulder, and a leaf segment having a generally radially directed second shoulder, said first and second shoulders lying substantially in a plane approximately intersecting and planar with said longitudinal axis.

7. The barrier cover of claim 6 wherein said plane provides an undercut between said first and second shoulders forming a positive locking force therebetween upon radial movement of said halves by the radial forces exerted thereagainst by said cushion.

8. The barrier cover of claim 7 wherein said second shoulder is provided by a peripheral portion of an aperture formed thru said leaf segment thru which said first shoulder radially outwardly extends.

* * * * *